Oct. 19, 1937.                E. H. PIRON                    2,096,004
                         CENTER PIN STRUCTURE
                         Filed April 3, 1933            2 Sheets-Sheet 2
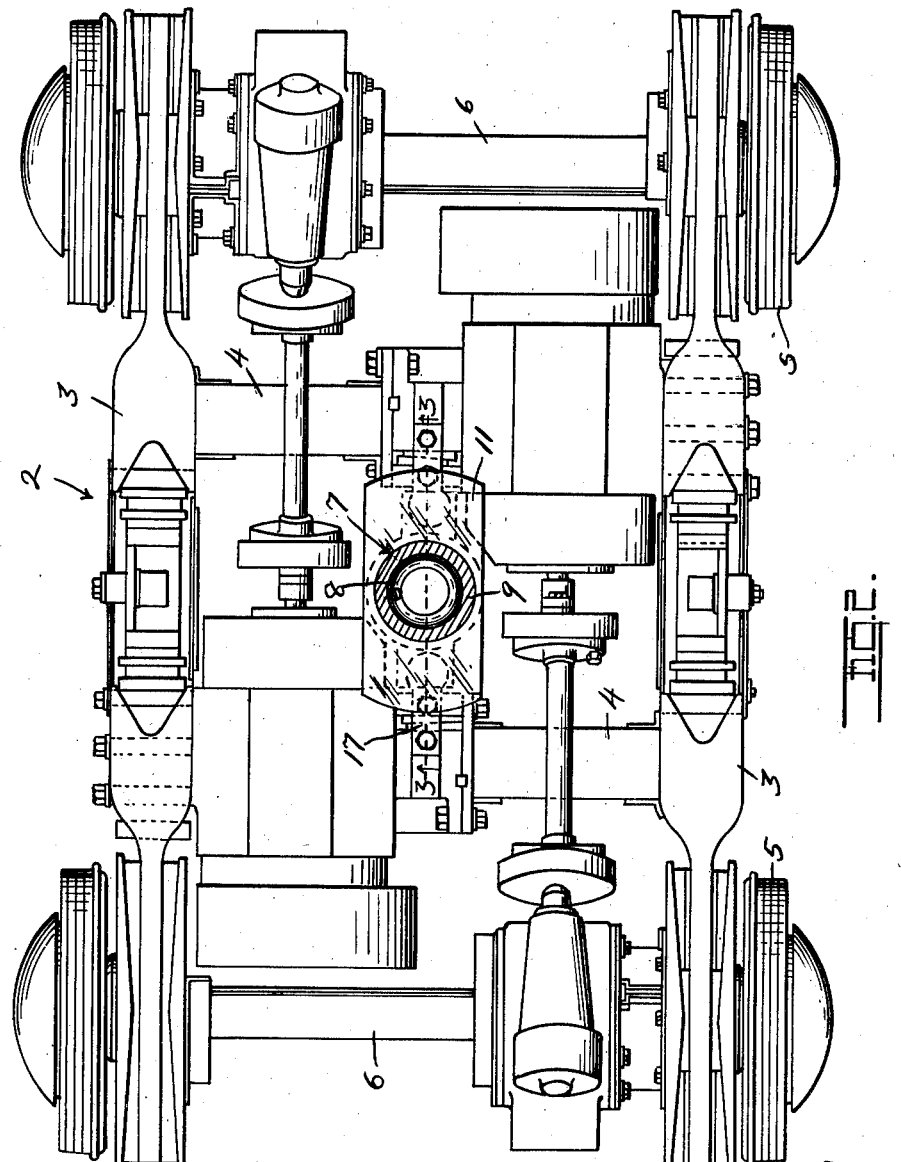
Inventor
Emil H. Piron Patented Oct. 19, 1937

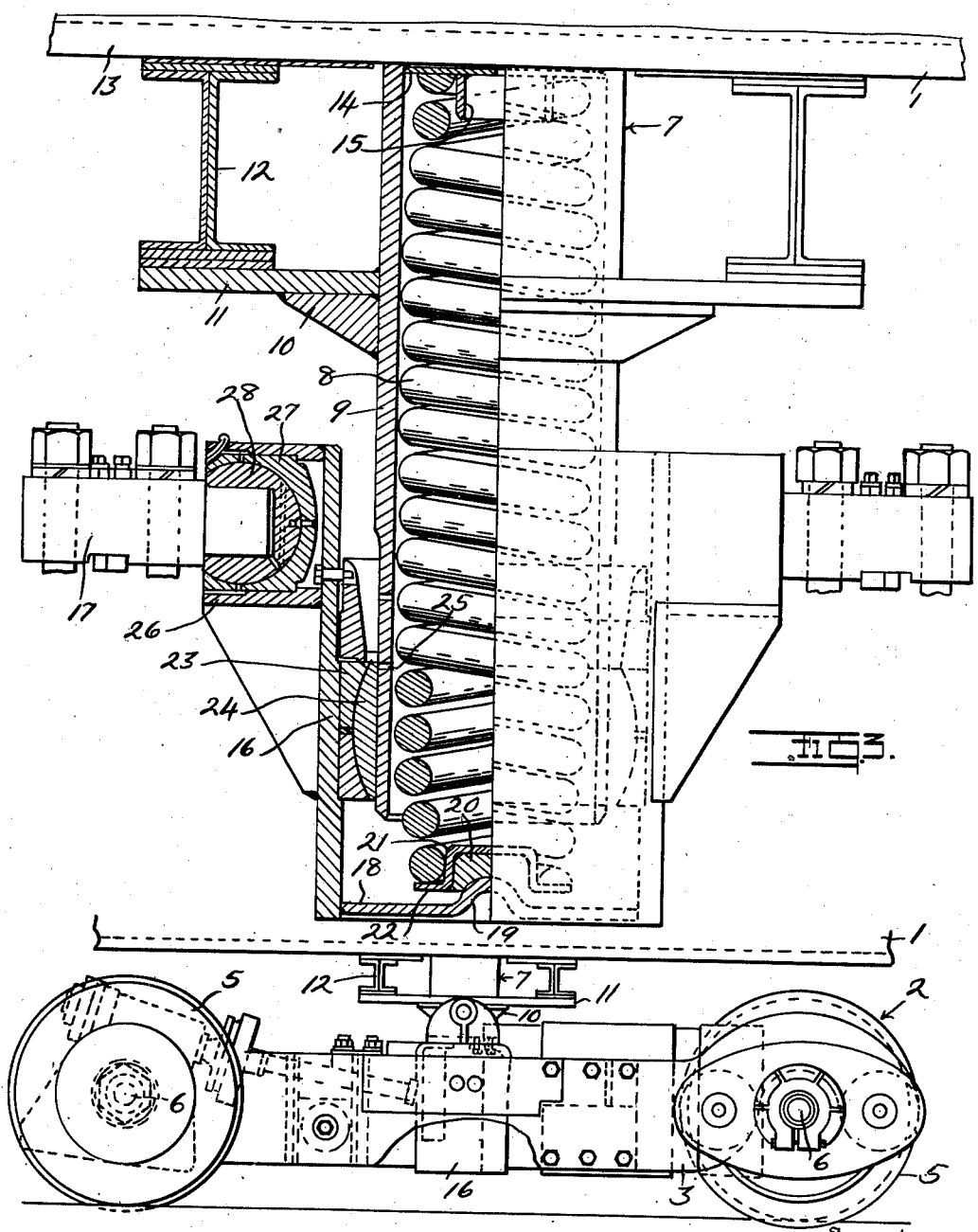

2,096,004

UNITED STATES PATENT OFFICE 2,096,004

CENTER PIN STRUCTURE

Emil H. Piron, Highland Park, Mich., assignor, by mesne assignments, to Transit Research Corporation, New York, N. Y., a corporation of New York Application April 3, 1933, Serial No. 664,248

20 Claims. (Cl. 105—199)

This invention relates to a center pin structure for rail vehicles and has for its object to provide an improved suspension and swiveling means for a car body which will be capable of articulated movement in every direction and adapted to propel the car body from a point well below the floor thereof.

In conventional design, a center support is provided atop the vehicle truck, the truck being adapted for rotation with respect to the body about a king pin arising centrally of this center support. The car body is therefore propelled from the truck through this support so that there is a force couple created which is numerically equal to the tractive force of the wheel (or the reactive force against the support) multiplied by the distance between the points of application of the two forces, which is the distance from the support to the rail. Due to the great distance or lever arm of the couple there is a decided tendency toward elevation of the front wheels of the truck during acceleration and a decided tendency toward elevation of the rear wheels during deceleration. As a result, there is, oftentimes, loss of adhesion of those wheels tending to elevate which causes local fatigues at the wheel tread, rail gouging, severe stresses on the axle as the wheels again find adhesion, and impulses which set up oscillations of high frequency throughout the truck and which cause the emission of noise. It is therefore an object of the present invention to provide a center pin structure comprising a king pin for attachment to a car body and a supporting base for the king pin in driving contact therewith at a point well below the floor of the body and as close to the road bed as practical in order to reduce the lever arm of the force couple, whereby all the wheels of the truck will carry substantial loading at all times and hence have more nearly uniform adhesion with the rails.

Another object is to provide a center pin structure having a low point of driving contact so arranged as to permit articulated universal movement, thereby eliminating lost motion clearances which are always conducive to localized fatigues, noise and severe stresses generally.

Another object is to incorporate resiliency in this center pin structure for purposes more fully explained in my copending application, Serial Number 666,606 filed April 17, 1933. The body driving member, as illustrated, is in the form of a rigid cylindrical member having the resilient means therewithin, the cylindrical member being universally guided by a spherical bearing. By this arrangement, I attain the further object of driving the body from the truck through a variable contact point, as the cylinder slides in its guide, in order to obtain resiliency between the truck and the car body without play in the driving contact.

It is a further object to provide a king pin capable of universal movement, as above referred to, in which the movement is definitely limited in a fore and aft direction, but which may be of considerably greater range transversely thereof in order that the car body may not be unduly restricted as to rolling motion. In order to articulate the king pin for such additional motion, I provide a pivotal connection between the truck and the support for the king pin, this further connection being so arranged as to restrict the major additional pivoting motion provided thereby to a transverse swinging only.

Another object of the invention is to provide a support for the center pin of such construction as will be capable of containing a body of lubricant sufficient to submerge the universal bearings at all times and hence capable of constituting an effective lubricating system.

Other objects and advantages, either directly described or indirectly accruing from the favorable relation of parts, will become hereinafter more fully apparent as reference is had to the accompanying drawings, wherein my invention is illustrated by way of example and not in a limiting sense, and in which Figure 1 is a side elevation, partly broken away, of a rail vehicle showing an embodiment of my invention;

Figure 2 is a plan view of a truck of the vehicle;

Figure 3 is an enlarged cross section on the line 3—3 of Figure 2.

The rail vehicle illustrated in the present example is a street car having the car body 1 which is mounted upon trucks, but one truck 2 being shown. The frame of the truck comprises the side girders 3 and the cross beams 4 secured to the side girders and preferably welded thereto. The wheels 5 for engaging the rails are mounted upon the axles 6 which are journaled at the ends of the side girders.

For partly supporting the car body from the truck and for propelling the car body from the truck, I have provided the center pin structure 7 which comprises the upright coil spring 8 forming the resilient load carrying member and the upright rigid or stiff king pin 9. The king pin is cylindrical and extends substantially the length of the coil spring and houses the major portion thereof. This king pin extends through the bolster plates 10 and 11 and is preferably integrally secured thereto as by welding, these plates in turn being preferably welded together. The plate 11 supports the cross beams or body bolsters 12 of the car body and these cross beams or body bolsters support the floor 13 of the car body, this floor being located preferably immediately above the upper end of the king pin 9. This upper end is closed by the plate 14 which is preferably welded thereto and the upper convolution of the coil spring engages this plate and is guided by the cylindrical pilot 15 secured to and depending from this plate. The construction is such that the king pin guides the coil spring, but allows relative movement of its convolutions.

The center pin structure also comprises the supporting base 16 in the nature of a rigid or stiff cylindrical member and the diametrically opposite supporting members 17 carrying the supporting base. The supporting base encircles and houses the lower portions of the coil spring 8 and the king pin 9 and is of greater diameter than the king pin to provide clearance for limited angular movement thereof relative to the supporting base. This supporting base 16 has its lower end closed by the plate 18 which is secured thereto preferably by welding and which is provided with the central or axial upwardly extending rounded or substantially hemi-spherical boss 19. 20 is a bearing having an arcuate lower face for fitting the upper face of the boss 19, this bearing being located within the cup-shaped supporting washer 21 having the annular flange 22 which is engaged by the lower convolution of the coil spring 8. The washer serves to laterally position the lower convolution and the washer and bearing are universally supported upon the supporting base. The supporting base 16 has fixedly secured therewithin the horizontally split outer bearing member 23 in which is snared in universal assembly the inner bearing member 24 having an inner cylindrical face in sliding contact with the cylindrical outer surface of the king pin 9.

The supporting base 16 extends downwardly between the cross beams 4 of the truck as far as possible while maintaining a desired road clearance, preferably through the plane containing the axes of the truck wheels 5, as shown more particularly in Figure 1, and the universally mounted guide member 24 in which the cylindrical housing member 9 slides is at or below the level of the plane containing the wheel axes, as also shown in this figure. As a result, it will be seen that I have provided an improved suspension and swivel means for a car body capable of articulated movement in every direction and adapted to propel the car body from a point well below the floor thereof and below the top of the cross beams and the side girders of the truck frame and also as close to the road bed as practical, whereby all the wheels of the truck will carry substantial loading at all times and therefore have more nearly uniform adhesion with the rails. With this arrangement, the car body is driven from the truck through a variable contact point, since the car body 1 is resiliently supported upon the truck 2 and the king pin 9 slides in the guide bearing member 24, whereby resiliency between the car body and the truck is obtained and at the same time lost motion clearances are eliminated, thereby eliminating noise and avoiding localized fatigues and severe stresses generally. Furthermore, the construction as thus far described is such that the king pin is capable of universal movement relative to its support, but this particular movement is definitely limited by the support, as indicated in dotted lines, illustrating maximum angularity of the various parts with respect to the base.

The supporting base 16 is capable of containing a body of lubricant sufficient to submerge both the load supporting and the guiding universal bearings at all times and the king pin 9 is formed with the transverse openings 25 located near and above the upper end of the bearing member 24, so that the lubricant may pass through these openings to lubricate the cooperating contacting surfaces of the king pin 9 and the bearing member 24 and of the bearing members 23 and 24 from above.

For the purpose of providing for considerably greater range of rolling movement of the car body on the truck and at the same time maintaining the limited movement of the car body in a fore and aft direction relative to the truck, the supporting base 16 is hinged to the supporting members 17 in a manner such that the supporting base may have a free swinging movement relative to the supporting members in a direction transversely of the truck. More particularly, the supporting members 17 are in the nature of trunnions which are in alignment and extend longitudinally or in a fore and aft direction of the truck from the cross beams 4. The supporting base 16 has fixedly secured to its upper portion and at diametrically opposite sides the cylindrical housings 26 in which are secured the outer bearing members 27 having a substantially spherical inner bearing face. 28 are the inner bearing members journaled upon the ends of the trunnions for endwise sliding engagement therewith upon relative motion of the cross beams 4 and extending within the outer bearing members and fitting the bearing faces of these bearing members. With this construction, it will be seen, therefore, that the car body may have a greater rolling movement transversely of the truck than longitudinally thereof, so that the rolling motion of the car body is free.

What I claim as my invention is:

1. A center pin structure for rail vehicles, comprising a supporting base, a king pin for connecting a car body to said base, said king pin having a limited universal movement with respect to said base and hinging means on said base substantially above the bottom thereof for pivotal attachment of said base to a truck to provide substantial rolling movement for the car body in a direction transverse to the direction of travel of said truck.

2. A center pin structure for rail vehicles, comprising a supporting base, a universally mounted resilient member for supporting a car body from said base, a stiff member for attachment to the car body, and a driving connection between said stiff member and said base interiorly of said base, said stiff member having a limited universal movement with respect to said base, said base having hinge members for attachment to a truck frame to provide substantial rocking movement for said stiff member transverse to the direction of travel of the truck.

3. In combination, a rail truck comprising side girders and cross beams secured to said girders, a car body for said truck, a mounted resilient member for largely supporting said body from said truck, said resilient member being supported by and between opposed relatively rockable surfaces, and a universal support between one of said surfaces and said resilient member.

4. In combination, a rail truck comprising side girders and cross beams secured to said girders, a car body for said truck, a stiff member depending from said body and having guiding connection with a stiff member on said truck to constitute a non-resilient means for transmitting the motion of said truck to said body, a resilient member for assuming a portion of the load of said body contained within said stiff members, and a universal support between said resilient member and one of said stiff members.

5. In combination, a rail truck, a car body, and a universally mounted resilient member supporting said body from said truck, said member being mounted for swiveling with said body upon its support upon relative rotation of said truck and said body.

6. In combination, a rail truck, a car body, and a resilient member supporting said body from said truck, said member being rotatably mounted for pivoting with respect to said truck upon relative rotation of said truck and said body.

7. In combination, a rail truck, a car body, and a resilient member supporting said body from said truck, said member being universally mounted for swiveling of said truck with respect thereto, a housing substantially enveloping said resilient member and depending from said car body, and an internally cylindrical bearing in sliding contact with the exterior of said housing for transmitting the moton of said truck to said body.

8. In combination, a rail truck comprising side girders and cross beams secured to said girders, a resilient member for partly supporting a body from said truck, a stiff member depending from the body, and a stiff member on said truck in sliding contact with said depending stiff member to provide a non-resilient driving contact from said truck to the body, said stiff member of said truck contacting said depending stiff member at a point substantially at or below the level of a plane containing the axes of normal rotation of the wheels of said truck whereby the distance between the points of application of the tractive effort of said wheels and the reaction thereof on said body is minimized, said resilient member being contained between and housed by said stiff members.

9. In combination, a rail truck comprising side girders and cross beams secured to said girders, a supporting base secured to said truck and projecting downwardly between said cross beams through the plane containing the axes of normal rotation of the wheels of said truck, a resilient member universally mounted in said base for supporting a car body, and a non-resilient sliding connection in said base toward the bottom thereof for driving the car body from points at or below the level of said plane.

10. In combination, a rail truck comprising side girders and cross beams secured to said girders, a supporting base secured to said cross beams and projecting through a plane containing the axes of normal rotation of the wheels of said truck, a resilient member universally mounted in the bottom of said base for supporting a car body, a cylindrical housing for said resilient member extending from a point of attachment to the car body into said base, and a universally mounted bearing snared in said base and encircling said housing near the lower end thereof, said bearing constituting a non-resilient sliding driving connection betwen said truck and said housing and the car body.

11. In combination, a rail truck, a coil spring means extending from said body to the intersection of diagonals of said truck for partially supporting a car body from said truck, a stiff member depending from the car body, and a sliding connection between said stiff member and a member of said truck for transmitting the propulsion efforts of said truck to the car body, said sliding connection being so located that a plane containing the axes of normal rotation of the wheels of said truck traverses or overpasses said connection.

12. A center pin structure for rail vehicles, comprising a rigid dependent king pin for attachment to a car body, a king pin base for attachment to a vehicle truck, a universal driving connection between said king pin and said base providing a limited universal movement therebetween, and universal connecting means supporting said base on the truck at longitudinally spaced points for allowing substantial transverse rolling movement between the truck and the car body, said universal driving connection being located towards the bottom of said base whereby it may be constantly lubricated by a bath of lubricant contained in said base.

13. A center pin structure for rail vehicles, comprising a rigid king pin for attachment to a car body, a king pin base for attachment to a vehicle truck, a spring member on said base and residing in said king pin for supporting said body and providing substantial vertical movement between the truck and car body, a driving connection between said king pin and said base for providing a limited universal movement therebetween, and spherical hinge means supporting said base from the truck, thereby providing substantial transverse rolling movement between the truck and car body.

14. In combination, a rail truck, a car body, a resilient member for supporting said body from said truck, a rigid housing for said member secured to said body, a cylindrical base having a closed bottom for supporting said resilient member, a bearing encircling said rigid housing having a spherical exterior, a shoulder in said base, a spherical bearing segment residing against said shoulder and on said first mentioned bearing, a second spherical bearing segment engaging said first mentioned bearing above said first mentioned segment, and means for maintaining said segments and first mentioned bearing in assembly, said base, said housing, said first mentioned bearing and said bearing segments defining a lubricant reservoir and said housing having an opening therethrough to provide for the escape of lubricant from the interior of said base and said housing to one of said bearing segments.

15. In combination, a rail truck, a car body, a resilient member for supporting said body from said truck, a rigid housing for said member secured to said body, a base member supporting said resilient member, a universal bearing interiorly of said base member encircling said housing, opposed trunnions on said truck fore and aft of said base member, and swivel bearings on said trunnions supporting said base member in driving relation with said housing.

16. In combination, a rail truck, a car body, a coil spring for resiliently supporting said body from said truck, a cylindrical housing for the major portion of said spring depending from said body, a base member supporting said spring, a universal bearing interiorly of said base member encircling said housing, opposed trunnions on said truck fore and aft of said base member, and swivel bearings on said trunnions longitudinally slidable thereon in a fore and aft direction, said swivel bearings supporting said base member in driving relation with said housing.

17. A center pin structure for rail vehicles, comprising a king pin for attachment to a car body, a king pin base for attachment to a vehicle truck and means associated with the king pin and base assembly providing a limited universal movement, a substantial transverse rolling movement and limited predetermined fore and aft movement between the truck and the car body.

18. In a center bearing construction for a rail truck, a coil center spring abutting a car body at its top end and supported in a truck member, a universal support between said spring and said truck member, a stiff member depending from said car body adjacent said spring as a means for preventing buckling thereof, and a universal connection between the truck and said stiff member.

19. The combination as set forth in claim 18 wherein said car body is driven through said universal connection and said stiff member.

20. In a rail truck, a center bearing construction comprising a center bearing member adapted to be attached to a car body, a second center bearing member cooperating with said first mentioned center bearing member, two transversely extending truck frame members one ahead and one behind said bearing members, and spaced universal bearings connecting said second center bearing member to each of said frame members, said universal bearings allowing the center bearing members and the car body to rock laterally with respect to the truck and permitting distortion of the truck frame without binding of the universal connections.

EMIL H. PIRON.